(12) United States Patent
Vik et al.

(10) Patent No.: US 12,482,549 B2
(45) Date of Patent: Nov. 25, 2025

(54) DISPLAYING VISUAL ELEMENTS ON A MEDICAL DEVICE

(71) Applicant: CareFusion 303, Inc., San Diego, CA (US)

(72) Inventors: Daniel Vik, Sunnyvale, CA (US); Sreelal Chandrasenan, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 18/978,664

(22) Filed: Dec. 12, 2024

(65) Prior Publication Data

US 2025/0132009 A1    Apr. 24, 2025

Related U.S. Application Data

(63) Continuation of application No. 18/678,556, filed on May 30, 2024, now Pat. No. 12,205,703, which is a
(Continued)

(51) Int. Cl.
*G09G 5/00* (2006.01)
*A61M 5/142* (2006.01)
(Continued)

(52) U.S. Cl.
CPC .......... *G16H 20/17* (2018.01); *A61M 5/142* (2013.01); *G06F 3/04847* (2013.01); *G09G 5/00* (2013.01);
(Continued)

(58) Field of Classification Search
CPC ....... G16H 20/17; G16H 40/63; A61M 5/142; G06F 3/04847; G09G 5/00; G09G 2340/14; G09G 2360/144
See application file for complete search history.

(56) References Cited

U.S. PATENT DOCUMENTS 5,331,549 A * 7/1994 Crawford, Jr. .......... G16H 40/67
600/513
5,637,093 A   6/1997 Hyman et al.
(Continued)

FOREIGN PATENT DOCUMENTS

CA        2967856 A1 * 10/2009 ........ A61M 5/16831
JP     2013-179973 A      9/2013
(Continued)

OTHER PUBLICATIONS

Cardinal Health, (n.d.). IVAC PCAM Syringe Pump—Technical Service Manual, 1000SM00017, Issue 2 (2005-2006). 106 pages.
(Continued)

*Primary Examiner* — Antonio A Caschera
(74) *Attorney, Agent, or Firm* — Mintz Levin Cohn Ferris Glovsky and Popeo, P.C.

(57) ABSTRACT

A medical system includes a medical device and a display for displaying a plurality of visual elements. The plurality of visual elements are associated with functions of the medical device. The medical system also includes a plurality of visual profiles for facilitating in controlling visual appearance of the plurality of visual elements displayed on the display, and a visual profile selector for selecting at least one of the plurality of visual profiles based on a state of the medical device.

25 Claims, 3 Drawing Sheets

Related U.S. Application Data continuation of application No. 17/539,526, filed on Dec. 1, 2021, now Pat. No. 12,205,700, which is a continuation of application No. 15/930,270, filed on May 12, 2020, now Pat. No. 11,217,338, which is a continuation of application No. 16/197,121, filed on Nov. 20, 2018, now Pat. No. 10,664,147, which is a continuation of application No. 14/939,875, filed on Nov. 12, 2015, now Pat. No. 10,140,004, which is a continuation of application No. 12/987,472, filed on Jan. 10, 2011, now Pat. No. 9,190,010.

(51) Int. Cl.
*G06F 3/04847* (2022.01)
*G16H 20/17* (2018.01)
*G16H 40/63* (2018.01)

(52) U.S. Cl.
CPC ....... *G16H 40/63* (2018.01); *A61M 2205/505* (2013.01); *G09G 2320/066* (2013.01); *G09G 2320/0666* (2013.01); *G09G 2340/14* (2013.01); *G09G 2360/144* (2013.01); *G09G 2380/08* (2013.01)

(56) References Cited

U.S. PATENT DOCUMENTS

| | | |
|---|---|---|
| 6,519,569 B1 | 2/2003 | White et al. |
| 8,235,938 B2 | 8/2012 | Eggers et al. |
| 8,359,338 B2 | 1/2013 | Butterfield et al. |
| 8,486,019 B2 | 7/2013 | White et al. |
| 8,514,086 B2 * | 8/2013 | Harper .................. A61B 5/145 340/505 |
| 9,190,010 B2 | 11/2015 | Vik et al. |
| 9,971,871 B2 | 5/2018 | Arrizza et al. |
| 10,140,004 B2 | 11/2018 | Vik et al. |
| 10,275,571 B2 | 4/2019 | Coffman et al. |
| 10,664,147 B2 | 5/2020 | Vik et al. |
| 11,217,338 B2 | 1/2022 | Vik et al. |
| 11,289,180 B2 | 3/2022 | Vik et al. |
| 11,324,880 B2 | 5/2022 | Garibaldi et al. |
| 11,901,058 B2 | 2/2024 | Vik et al. |
| 12,028,414 B1 | 7/2024 | Borges et al. |
| 12,205,700 B2 | 1/2025 | Vik et al. |
| 12,205,703 B2 | 1/2025 | Vik et al. |
| 12,278,868 B2 | 4/2025 | Borges et al. |
| 2002/0019714 A1 | 2/2002 | Carliale et al. |
| 2002/0038392 A1 | 3/2002 | De La Huerga |
| 2002/0099273 A1 | 7/2002 | Bocionek et al. |
| 2002/0188259 A1 | 12/2002 | Hickle et al. |
| 2002/0193679 A1 | 12/2002 | Malave et al. |
| 2003/0069614 A1 | 4/2003 | Bowman et al. |
| 2003/0139701 A1 | 7/2003 | White et al. |
| 2003/0200117 A1 | 10/2003 | Manetta et al. |
| 2004/0030323 A1 | 2/2004 | Ullestad et al. |
| 2004/0032426 A1 | 2/2004 | Rutledge et al. |
| 2004/0078231 A1 | 4/2004 | Wilkes et al. |
| 2004/0172301 A1 | 9/2004 | Mihai et al. |
| 2005/0038332 A1 | 2/2005 | Saidara et al. |
| 2005/0055242 A1 | 3/2005 | Bello et al. |
| 2005/0055244 A1 | 3/2005 | Mullan et al. |
| 2005/0108057 A1 | 5/2005 | Cohen et al. |
| 2005/0171512 A1 | 8/2005 | Flaherty |
| 2006/0026205 A1 | 2/2006 | Butterfield |
| 2006/0081257 A1 | 4/2006 | Krogh et al. |
| 2006/0098666 A1 | 5/2006 | Francis Conde Powell |
| 2006/0167722 A1 | 7/2006 | Mrf Struys et al. |
| 2006/0189926 A1 | 8/2006 | Hall et al. |
| 2006/0206356 A1 | 9/2006 | Vanderveen |
| 2006/0229557 A1 | 10/2006 | Fathallah et al. |
| 2007/0041626 A1 | 2/2007 | Weiss et al. |
| 2007/0098565 A1 | 5/2007 | Parsee et al. |
| 2007/0124002 A1 | 5/2007 | Estes et al. |
| 2007/0210157 A1 | 9/2007 | Miller |
| 2007/0233521 A1 | 10/2007 | Wehba et al. |
| 2007/0251835 A1 | 11/2007 | Mehta et al. |
| 2007/0254593 A1 | 11/2007 | Jollota et al. |
| 2007/0258395 A1 | 11/2007 | Jollota et al. |
| 2007/0267475 A1 | 11/2007 | Hoglund et al. |
| 2007/0287931 A1 | 12/2007 | Dilorenzo |
| 2008/0086333 A1 | 4/2008 | Hertel et al. |
| 2008/0125657 A1 | 5/2008 | Chomas et al. |
| 2008/0201169 A1 | 8/2008 | Galasso et al. |
| 2008/0275422 A1 | 11/2008 | Ross |
| 2008/0281167 A1 | 11/2008 | Soderberg et al. |
| 2008/0294142 A1 | 11/2008 | Patel et al. |
| 2008/0294294 A1 | 11/2008 | Blomquist |
| 2008/0300572 A1 | 12/2008 | Rankers et al. |
| 2009/0063402 A1 | 3/2009 | Hayter |
| 2009/0069745 A1 | 3/2009 | Estes et al. |
| 2009/0150865 A1 | 6/2009 | Young et al. |
| 2009/0153058 A1 | 6/2009 | Feng et al. |
| 2009/0156990 A1 | 6/2009 | Wenger et al. |
| 2009/0156991 A1 | 6/2009 | Roberts |
| 2009/0157040 A1 | 6/2009 | Jacobson et al. |
| 2009/0157695 A1 | 6/2009 | Roberts |
| 2009/0183105 A1 | 7/2009 | Teel, IV et al. |
| 2009/0271729 A1 | 10/2009 | Killoren Clark et al. |
| 2009/0275886 A1 | 11/2009 | Blomquist et al. |
| 2010/0100037 A1 | 4/2010 | Cozmi et al. |
| 2010/0121170 A1 | 5/2010 | Rule |
| 2010/0160860 A1 | 6/2010 | Celentano et al. |
| 2011/0006876 A1 | 1/2011 | Moberg et al. |
| 2011/0009813 A1 | 1/2011 | Rankers |
| 2011/0009814 A1 | 1/2011 | Tsoukalis |
| 2011/0022981 A1 | 1/2011 | Mahajan et al. |
| 2011/0047499 A1 | 2/2011 | Mandro et al. |
| 2011/0072379 A1 | 3/2011 | Gannon et al. |
| 2011/0259954 A1 | 10/2011 | Bartz et al. |
| 2011/0264044 A1 | 10/2011 | Bartz et al. |
| 2012/0215169 A1 | 8/2012 | Moberg et al. |
| 2012/0220928 A1 | 8/2012 | Estes et al. |
| 2013/0104120 A1 | 4/2013 | Arrizza et al. |
| 2013/0138452 A1 | 5/2013 | Cork et al. |
| 2013/0185098 A1 | 7/2013 | Mitchel et al. |
| 2013/0218080 A1 | 8/2013 | Peterfreund et al. |
| 2013/0248426 A1 | 9/2013 | Pouchoulin |
| 2013/0253946 A1 | 9/2013 | Broselow |
| 2013/0283529 A1 | 10/2013 | Hayes et al. |
| 2013/0317753 A1 | 11/2013 | Kamen et al. |
| 2014/0039455 A1 | 2/2014 | Miller et al. |
| 2014/0188516 A1 | 7/2014 | Kamen et al. |
| 2014/0323959 A1 | 10/2014 | Lebel et al. |
| 2015/0154364 A1 | 6/2015 | Biasi et al. |
| 2015/0356253 A1 | 12/2015 | Sims et al. |
| 2015/0356255 A1 | 12/2015 | Simpson et al. |
| 2016/0038163 A1 | 2/2016 | Thor et al. |
| 2017/0061083 A1 | 3/2017 | Jackson |
| 2017/0128668 A1 | 5/2017 | Miller et al. |
| 2018/0193561 A1 | 7/2018 | Susi |
| 2020/0023127 A1 | 1/2020 | Simpson et al. |
| 2020/0051190 A1 | 2/2020 | Kamen et al. |
| 2020/0206413 A1 | 7/2020 | Silkaitis et al. |
| 2020/0357500 A1 | 11/2020 | Rubalcaba, Jr. et al. |
| 2021/0068683 A1 | 3/2021 | Reich |
| 2021/0146117 A1 | 5/2021 | Reich et al. |
| 2022/0001106 A1 | 1/2022 | DiPerna et al. |
| 2025/0032715 A1 | 1/2025 | Dobbles et al. |

FOREIGN PATENT DOCUMENTS

| | | |
|---|---|---|
| WO | WO-2006/125692 A1 | 11/2006 |
| WO | WO-2008/059495 A2 | 5/2008 |

OTHER PUBLICATIONS

Cardinal Health, (n.d.). IVAC Volumetric Pump—Models 597 & 598, Technical Service Manual, 1000SM0016, Issue 3 (1998-2006). 76 pages.

(56) References Cited

OTHER PUBLICATIONS

Manual for "IntelliVue Patient Monitor". Philips. pp. 1-534. accessed via web: https://medaval.ie/docs/manuals/Intellivue-Manual.pdf Jan. 15, 2008. (Year: 2008).

CareFusion Corporation and Cerner Corporation Integrate Smart Pump Technologies to Help Improve Medication Safety and Efficiency. Biospace. Webpage. (Apr. 19, 2012). 10 pages.

Defendants Baxter Int'l and Baxter Healthcare's Opening Brief in Support of Their Motion to Dismiss for Failure to State a Claim, *Becton, Dickinson and Co. et al. v. Baxter Int'l Inc. et al.*, No. 1-25-cv-00591-CFC (D. Del. Jul. 10, 2025), ECF No. 18. 29 pages.

Defendants Baxter Int'l and Baxter Healthcare's Reply Brief in Support of Their Motion to Dismiss for Failure to State a Claim, *Becton, Dickinson and Co. et al. v. Baxter Int'l Inc. et al.*, No. 1-25-cv-00591-CFC (D. Del. Aug. 29, 2025), ECF No. 31. 18 pages.

Order Granting Request for Ex Parte Reexamination of U.S. Pat. No. 12,205,703 issued Jan. 21, 2025. Control No. 90/015,391. Order issued Aug. 14, 2025, 25 pages.

Plaintiffs' Answering Brief in Opposition to Defendants' Motion to Dismiss Pursuant to Fed R. Civ. P. 12(b)(6), *Becton, Dickinson and Co et al. v. Baxter Int'l, Inc. et al.*, No. 1-25-cv-00591-CFC (D. Del. Aug. 11, 2025), ECF No. 26. 34 pages.

Request for Ex Parte Reexamination of U.S. Pat. No. 12,205,703 issued Jan. 21, 2025. Request filed Jul. 16, 2025, assigned Control No. 90/015,391. 77 pages.

SIGMA International, Inc. (Aug. 2008). Sigma Spectrum Infusion Pump Service Manual. P/N 41019. (Rev. T). 56 pages.

SIGMA International, Inc. (Aug. 2009). Sigma Spectrum Infusion Pump Service Manual. P/N 41019. (Rev. W). 58 pages.

SIGMA International. (May 15, 2008). sigmaspectrum operator's manual. Sigma P/N 41018. (Rev. X). 63 pages.

SIGMA International. (Oct. 8, 2009). sigmaspectrum operator's manual. Sigma P/N 41018. (Rev. AL). 72 pages.

Sigma, LLC. (2010). sigmaspectrum Operator's Manual 35700ABB & 35700BAX. Sigma Manual No. 41018. (Rev. AR). 102 pages.

Sigma, LLC. (2010). sigmaspectrum Service Manual 35700ABB & 35700BAX. Sigma Manual No. 41019. (Rev. AA). 68 pages.

Sigma, LLC. (2011). sigmaspectrum Operator's Manual 35700BAX & 35700ABB. Manual 41018-6.05/6.2.4. (Rev. C). 119 pages.

Sigma, LLC. (2011). sigmaspectrum Operator's Manual 35700BAX & 35700ABB. Manual 41018-6.05/6.2.4. (Rev. D). 125 pages.

\* cited by examiner

DISPLAYING VISUAL ELEMENTS ON A MEDICAL DEVICE

CROSS REFERENCE TO RELATED APPLICATIONS

This application is a continuation of U.S. patent application Ser. No. 18/678,556 filed May 30, 2024, entitled DISPLAYING VISUAL ELEMENTS ON A MEDICAL DEVICE, which is a continuation of U.S. patent application Ser. No. 17/539,526, filed Dec. 1, 2021, entitled DISPLAYING VISUAL ELEMENTS ON A MEDICAL DEVICE, which is a continuation of U.S. patent application Ser. No. 15/930,270 filed May 12, 2020, entitled DISPLAYING VISUAL ELEMENTS ON A MEDICAL DEVICE, now U.S. Pat. No. 11,217,338, which is a continuation of U.S. patent application Ser. No. 16/197,121 filed Nov. 20, 2018, entitled DISPLAYING VISUAL ELEMENTS ON A MEDICAL DEVICE, now U.S. Pat. No. 10,664,147, which is a continuation of U.S. patent application Ser. No. 14/939,875, filed Nov. 12, 2015, entitled DISPLAYING VISUAL ELEMENTS ON A MEDICAL DEVICE, now U.S. Pat. No. 10,140,004, which is a continuation of U.S. patent application Ser. No. 12/987,472, filed Jan. 10, 2011, entitled DISPLAYING VISUAL ELEMENTS ON A MEDICAL DEVICE, now U.S. Pat. No. 9,190,010, the disclosures of which are incorporated herein by reference.

BACKGROUND

A display screen on a medical device allows for a clinician to visibly see some parameters of the medical device. However, adjustments of the display screen typically does not allow for optimal viewability. In particular, current medical devices do not allow for color customization to inform the user of how the medical device operates.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The description below will first describe the components of medical system 100. The description will then describe the functionality of the components during use of medical system 100.

In general, medical system 100 allows for detailed configuration of the appearance of a display to ensure optimal viewability and display perception based on clinical practices and preferences. Moreover, adjustments are made based on environment. As a result, errors are reduced and care is improved.

In contrast, conventional systems have minimal configurability. For example, backlight and contrast level may be adjusted. However, the adjustments do not give optimal viewability for the light conditions. Moreover, the conventional systems don't allow for customization, such as color, to inform the user of how the device is configured to operate.

Figure 1:
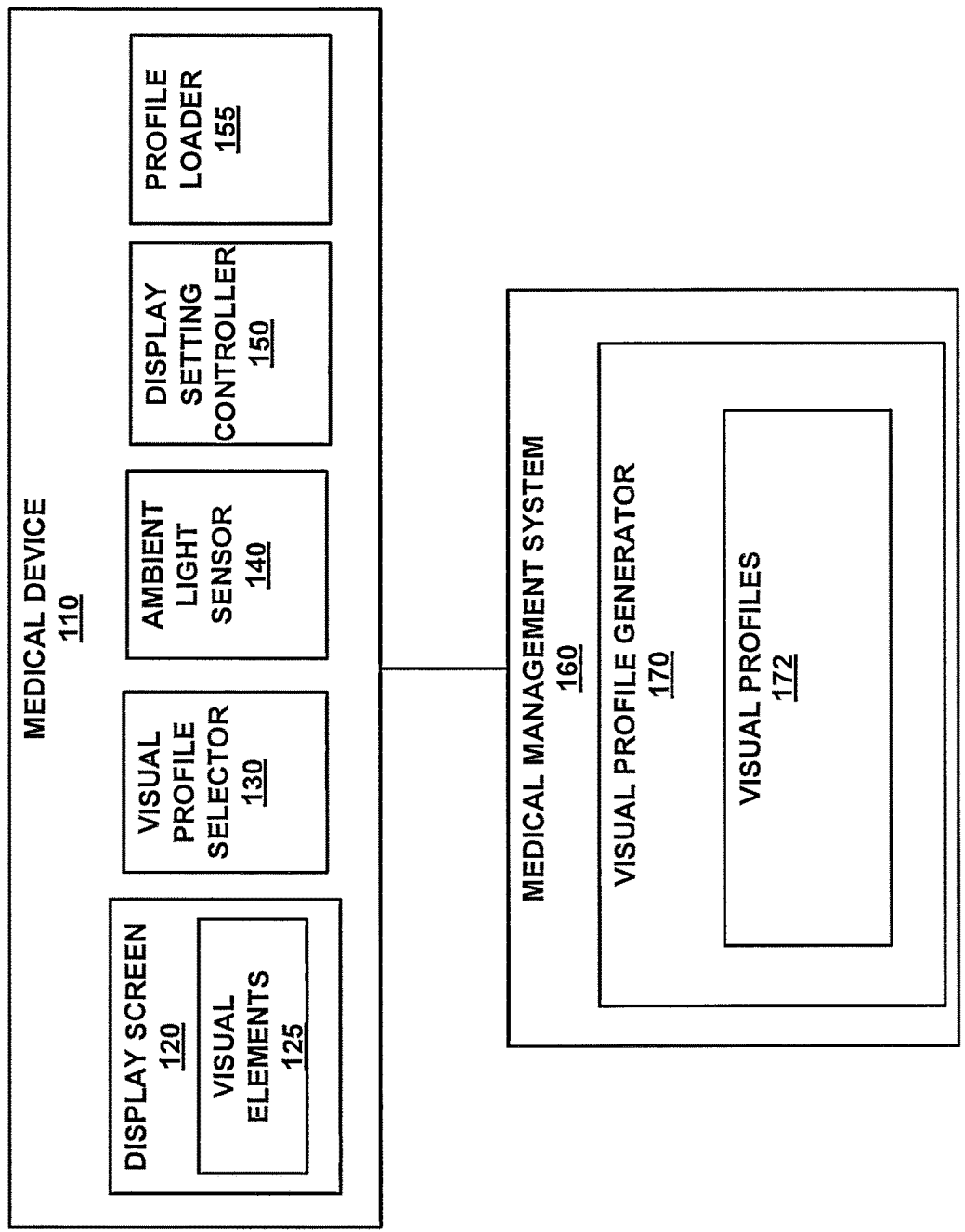
FIG. 1 illustrates an example of a medical system, in accordance with an embodiment of the present invention.

FIG. 1 depicts an embodiment of medical system 100. Medical system 100 includes medical device 110 and medical management system 160. In one embodiment, medical system 100 is a medication delivery system. In such an embodiment, medical device 110 is an infusion pump.

Medical management system 160 includes visual profile generator 170 and visual profiles 172. Visual profile generator 170 is for generating visual profiles 172. Visual profiles 172 are configured for facilitating in the control of the visual appearance of visual elements 125, which will be described in detail below.

Medical device 110 includes display screen 120, visual profile selector 130, ambient light sensor 140, display setting controller 150, and profile loader 155.

Display screen 120 is for displaying visual elements 125. Display screen 120 can be any display screen able to display visual elements 125. For example, display screen 120 is a color display screen for displaying visual elements 125.

Visual elements 125 are associated with functions of medical device 110. For example, visual elements 125 are associated with functions such, as but not limited to, parameters, medicine, or medicine dosage. Visual elements 125 can include icons, images, textures, fonts, etc., based on workflow, user inputs (e.g., user input fields), graphical libraries, etc.

Figure 2:
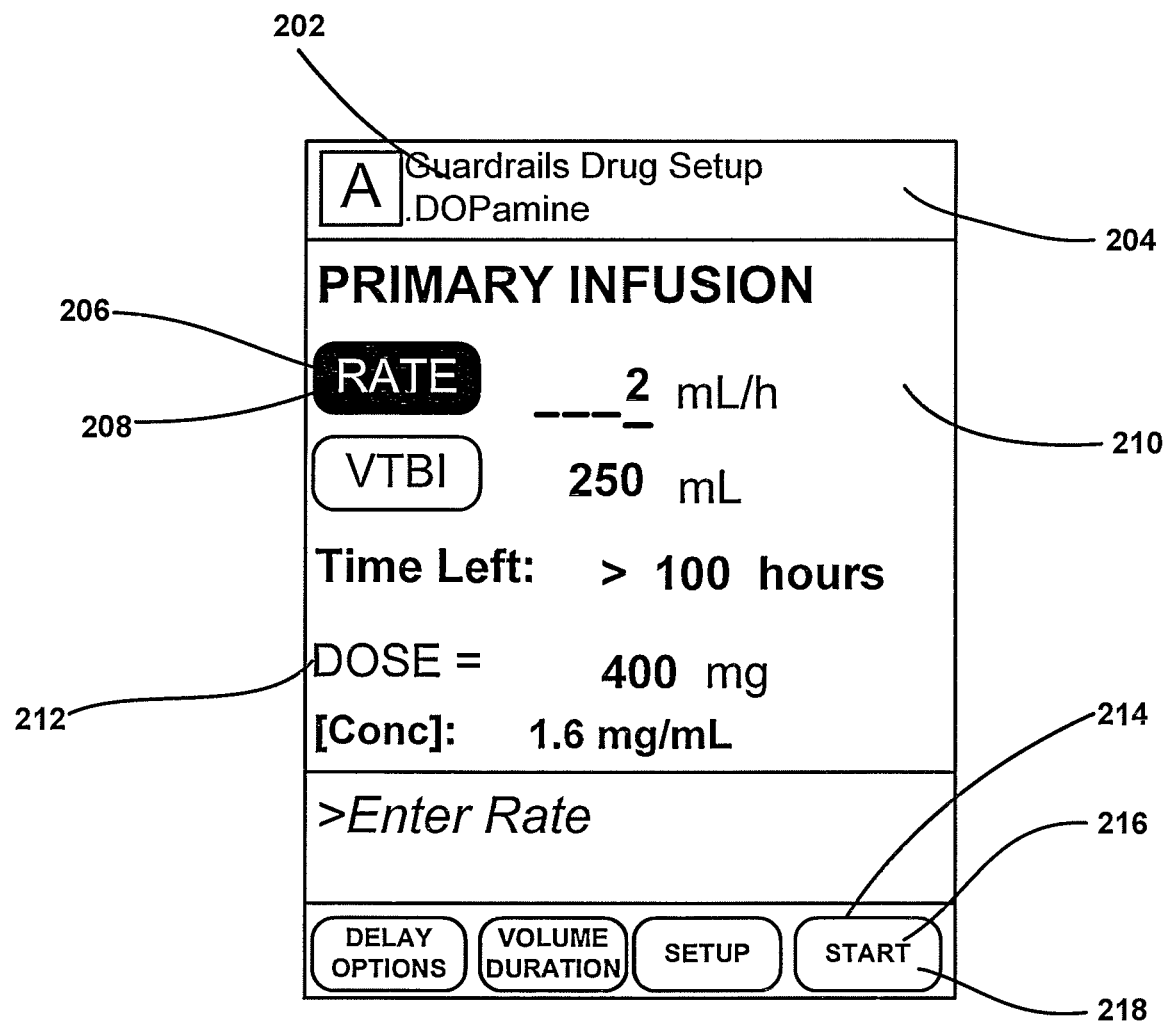
FIG. 2 illustrates an example of visual elements, in accordance with an embodiment of the present invention.

FIG. 2 depicts an embodiment of visual elements 125 displayed on display screen 120. In this embodiment, visual elements 125 include title bar text color 202, title bar color 204, selected button text color 206, selected button color 208, background color 210, text color 212, button border color 214, button text color 216 and button color 218. It should be appreciated that the number of elements and their definitions can vary depending on the graphical user interface engine (not shown) that is used to render visual elements 125 on display screen 120.

Visual profiles 172 facilitate in the control of the visual appearance of visual elements 125, as described above. In other words, visual profiles manage the visual configurations of visual elements 125 to enhance safe use of system 100. Also, the visual configuration of visual elements 125 enable power saving of medical device 110.

In general, visual profiles 172 allow for the customization of the visual performance of display screen 120. For example, visual profiles 172 allow for the visual customization (e.g., color customization) of visual elements 125. Visual profiles 172 depend on, among other things, criticality, classification, state of the device, state of the patient (e.g. heart rate), device association, state of the device class, clinical workflow, care area, clinical practices, environment (ambient light), device capabilities etc.

Visual profiles 172 include, but are not limited to, a color, a pattern, a bitmap, a texture or a theme.

In various embodiments, visual profiles 172 utilize a color space. For example, a RGB color space, CMYC color space or an HSV color space. Colors associated with visual profiles 172 can be a combination of a base color from a color space modified by adding contrast, brightness or saturation, by configuration or in conjunction with sensed ambient light.

In one embodiment, visual profiles 172 include a color profile, which is a set of color configuration vectors that comprise each color region. The color regions are represented by a color configuration vector that specifies the perceived color of the region. The color profile, P is defined by the set:

$$P = \{C_{R1}, C_{R2} \ldots C_{Rn}\}. \quad (1)$$

The configuration parameters for a particular color region to be display on display screen 120 is represented by a configuration vector, $$C_R = \{I_R, I_G, I_B, B_L\}, \quad (2)$$

where $I_R$, $I_G$, $I_B$ are the intensity of the red, green and blue color channels making the color, and $B_L$ is the intensity of the backlight. Although $B_L$ can be configured individually per color (in equation 2), limitations on backlight devices often require the $B_L$ parameter to be the same for all regions on the display screen at a given point in time, which is the case in this embodiment.

Accordingly, the color profile is, $$P = \{B_L, C'_{R1}, C'_{R2} \ldots C'_{Rn}\}, \quad (3)$$

where $C'_R$ is the color vector $C_R$ without the individual configuration parameter $B_L$ present.

Visual profile selector 130 is for selecting visual profiles 172 based on a state of medical system 100 and/or medical device 110. States of medical system 100 and/or device 110 can be, but are not limited to, care area, power state, clinician, clinician preferences, patient, ambient light, alarm settings, infusing, priming, maintenance mode, pressure limits and pump orientation. In various embodiments, the states are dynamic.

For example, a first medical device is assigned to a male patient, and a second medical device is assigned to a female patient As such, visual profile selector 130 of the first medical device selects visual profiles 172 (e.g., a blue color) based on the first medical device assigned to the male patient. Likewise, visual profile selector 130 of the second medical device selects visual profiles 172 (e.g., a pink color) based on the second medical device assigned to the female patient.

In one embodiment, visual profile selector 130 utilizes a rule engine to select a visual profile. In such an embodiment, a rule may be stored in plain text or structured text, such as XML, which can be updated dynamically. For example, a rule can be, that if the current care area is "Neonatal," then use Profile 1, or if the current care area is "ICU, then use profile 2.

As a result, visual elements 125 of the first medical device for the male patient are customized with a blue color. Similarly, visual elements 125 of the second medical device are customized with a pink color.

Moreover, visual profiles 172 based on the second medical device assigned to the female patient could also include a texture, such as parallel stripes. Accordingly, visual elements 125 of the second medical device are customized with a pink color with parallel stripes.

Additionally, visual profile selector 130 selects a visual profile of the visual profiles 172 based on the system state and applies the visual profile to an active profile. In one embodiment, visual profiles 172 are processed at run time to adjust to changes in ambient light.

In one embodiment, the aggregate state of medical device 110 is the sum of the state of medical device 110 and clinical configurations. It should be appreciated that an active profile can contain visual configurations from multiple visual profiles. In various embodiments, a visual profile includes visual configurations from multiple visual profiles. Also, sub-system states are prioritized to achieve the safest active profile based on inputs to medical device 110.

In various embodiments, visual profiles 172 includes rules. For example, if a patient's pulse rate is greater than X and care area is C, then visual profile 1 is selected. However, if the care area B, then visual profile 2 is selected. Accordingly, profile selector 130 utilizes rules based on the states, mentioned above, to select the appropriate visual profile.

Visual profiles 172 can be set by a pharmacy, hospital practices, biomed, clinician, and the like. In one embodiment, the pharmacy and hospital practices are a part of a drug library.

In one embodiment, visual profiles 172 are stored on memory (not shown) in medical management system 160. In another embodiment, visual profiles 172 are stored in memory (not shown) on medical device 110. For example, visual profiles 172 are a part of a firmware image or transferred from medical management system 160 through a data port and stored into memory of medical device 110. In another embodiment, visual profiles 172 may be accessed from a portable device (e.g., PDA, tablet, etc).

In various embodiments, visual profiles 172 are activated by applying the parameters in the profiles to different subsystems using a memory bus. The parameters are sent from memory to a graphical user interface engine which executes within a microprocessor. The interface engine applies the visual information (e.g., colors) to different visual elements 125 that are viewed on display 120 and then sends the updated screens to display 120.

Profile loader 150 is for managing a set of currently available visual profiles 172. For example, profile loader 150 coordinates uploading of new profiles from medical management system 160. Moreover, profile loader 150 allows modifications to visual profiles 172 made by a user locally on medical device 110.

Display setting controller 150 is for controlling the settings of display screen 120. For example, display setting controller 150 controls the display settings (e.g., backlight, contrast, etc.) in response to ambient light detected by ambient light sensor 140.

Figure 3:
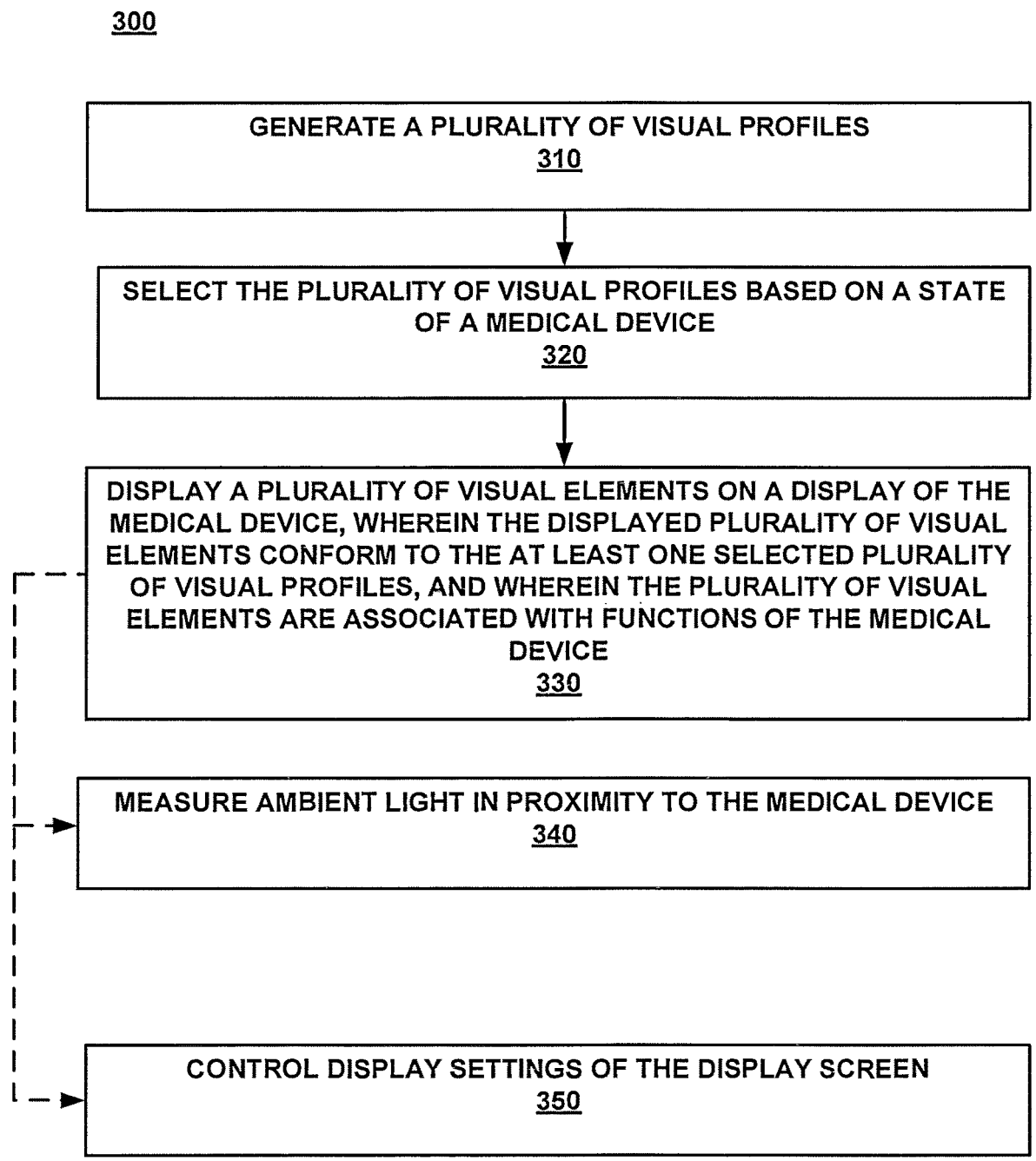
FIG. 3 illustrates a method for displaying visual elements, in accordance with an embodiment of the present invention.

FIG. 3 depicts an embodiment of a method 300 for displaying visual elements. In various embodiments, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed at least by position medical system 100, as described in FIGS. 1 and 2.

At 310 of method 300, a plurality of visual profiles are generated. For example, visual profiles 172 are generated by visual profile generator 170.

At 320, the plurality of visual profiles are selected based on a state of a medical device. For example, a visual profile including a bitmap of animal is selected based on patient associated with medical device 110. Moreover, a visual profile including a red color is selected for when medical device 110 is infusing medication to the patient.

At 330, a plurality of visual elements are displayed on a display of the medical device, wherein the displayed plurality of visual elements conform to the at least one selected plurality of visual profiles, and wherein the plurality of visual elements are associated with functions of the medical device.

Continuing the example from above, displayed background color 210 is a bitmap of an animal because the background conforms to the visual profile that includes the bitmap of the animal. Similarly, text color 212 is red because the text color of the "dose" conforms to the visual profile that includes a red color for infusing medication to the patient.

In one embodiment, at 340, ambient light is measured in proximity to the medical device. For example, ambient light is measured by ambient light sensor 140.

In another embodiment, at 350, display settings of the display screen are controlled. For example, contrast and/or backlight is adjusted by display setting controller 150 based on the ambient light measured by ambient light sensor 140.

Various embodiments of the present invention are thus described. While the present invention has been described in particular embodiments, it should be appreciated that the present invention should not be construed as limited by such embodiments, but rather construed according to the following claims.

What is claimed is:

1. An infusion pump comprising:
   a color display configured to display a plurality of visual elements, wherein the plurality of visual elements include a title bar having a title bar color;
   a processor; and
   a non-transitory memory storing executable instructions that, when executed by the processor, cause the infusion pump to:
      determine an alarm setting of the infusion pump, the alarm setting being based on an operating parameter associated with a treatment provided by the infusion pump;
      automatically determine a criticality for the alarm setting;
      automatically activate, based on the criticality and a rule for a visual profile selection, a visual profile of the infusion pump, the visual profile including at least one color selection for the title bar color; and
      display, on the color display of the infusion pump, the title bar using the at least one color selection.

2. The infusion pump of claim 1, wherein the operating parameter includes a care area for the infusion pump, and wherein the executable instructions, when executed by the processor, cause the infusion pump to present a user interface to receive the operating parameter.

3. The infusion pump of claim 1, wherein the plurality of visual elements further include a button and wherein the visual profile includes at least one button color selection for the button, the at least one button color selection comprising a button border color, a button text color, a button color, a selected button text color, a selected button color, or one or more grayscale patterns.

4. The infusion pump of claim 1, wherein the executable instructions, when executed by the processor, cause the infusion pump to: display, on the color display of the infusion pump, an icon to indicate the cause of the alarm setting.

5. The infusion pump of claim 1, wherein the executable instructions, when executed by the processor, cause the infusion pump to: display, on the color display of the infusion pump, an icon to indicate the criticality of the alarm setting.

6. The infusion pump of claim 1, wherein the executable instructions, when executed by the processor, cause the infusion pump to:
   adjust, based on the visual profile, the color selection for the title bar color.

7. The infusion pump of claim 6, wherein adjusting the color selection for the title bar color includes changing the title bar color between at least two colors.

8. The infusion pump of claim 1, further comprising a sensor, and wherein determining the alarm setting is further based on a signal received from the sensor.

9. The infusion pump of claim 8, wherein the sensor is an ambient light sensor.

10. The infusion pump of claim 9, wherein the alarm setting comprises a contrast level, and
   wherein the executable instructions, when executed by the processor, cause the infusion pump to adjust the contrast level based on ambient light detected by the ambient light sensor.

11. The infusion pump of claim 8, wherein the sensor is a pressure sensor, and wherein the signal indicates a pressure condition for a fluid pathway of the treatment.

12. The infusion pump of claim 11, wherein the pressure sensor is an occlusion sensor.

13. The infusion pump of claim 1, wherein the executable instructions, when executed by the processor, cause the infusion pump to:
   detect a changed criticality for the alarm setting;
   activate, based on the changed criticality, an alternate color selection for the title bar color; and
   update the display of the title bar on the color display based on the alternate color selection.

14. The infusion pump of claim 13, wherein the alternate color selection is included in the visual profile.

15. The infusion pump of claim 14, wherein the alternate color selection is included in an alternate visual profile, and
   wherein the executable instructions, when executed by the processor, cause the infusion pump to activate the alternate visual profile based on the changed criticality.

16. The infusion pump of claim 1, wherein an alternate color selection is included in the visual profile.

17. The infusion pump of claim 1, wherein the executable instructions, when executed by the processor, cause the infusion pump to associate the infusion pump with a clinician, and
   wherein activating the visual profile is further based on a preference of the clinician.

18. The infusion pump of claim 1, wherein the executable instructions, when executed by the processor, cause the infusion pump to:
receive an update to the visual profile; and
adjust, based on the updated profile, the color selection for the title bar color.

19. The infusion pump of claim 1, wherein the executable instructions, when executed by the processor, cause the infusion pump to associate the infusion pump with a patient, and
wherein activating the visual profile is further based on a characteristic of the patient.

20. The infusion pump of claim 1, wherein the executable instructions, when executed by the processor, cause the infusion pump to:
receive a user input designating a care area.

21. The infusion pump of claim 1, wherein the executable instructions, when executed by the processor, cause the infusion pump to:
receive a user input identifying a care area associated with the infusion pump;
determine, based on the care area, that an additional rule for the visual profile selection is satisfied;
activate, based on the additional rule for the visual profile selection, the visual profile of the infusion pump based on the care area; and
display, on the color display of the infusion pump, the visual profile based on the care area associated with the infusion pump.

22. An infusion pump comprising:
a color display configured to display a title bar having a title bar color;
an ambient light sensor;
a processor; and
a non-transitory memory storing executable instructions that, when executed by the processor, cause the infusion pump to:
determine an alarm setting of the infusion pump, the alarm setting being based on an operating parameter associated with a treatment provided by the infusion pump;
automatically determine a criticality for the alarm setting;
automatically activate, based on the criticality for the alarm setting and a rule for a visual profile selection, a visual profile of the infusion pump, the visual profile including at least one color selection for the title bar color;
display, on the color display of the infusion pump, the title bar using the at least one color selection.

23. The infusion pump of claim 22, wherein the executable instructions, when executed by the processor, cause the infusion pump to:
receive a signal generated by the ambient light sensor; and
adjust a brightness of the infusion pump, based on the signal generated by the ambient light sensor.

24. The infusion pump of claim 22, wherein the executable instructions, when executed by the processor, cause the infusion pump to:
receive a user input designating a care area.

25. The infusion pump of claim 22, wherein the executable instructions, when executed by the processor, cause the infusion pump to:
receive a user input identifying a care area associated with the infusion pump;
determine, based on the care area, that an additional rule for the visual profile selection is satisfied;
activate, based on the additional rule for the visual profile selection, the visual profile of the infusion pump based on the care area; and
display, on the color display of the infusion pump, the visual profile based on the care area associated with the infusion pump.

* * * * *